(Model.)
M. M. CAMP.
Pipe for Drains, Gas and Water.
No. 227,412.          Patented May 11, 1880.
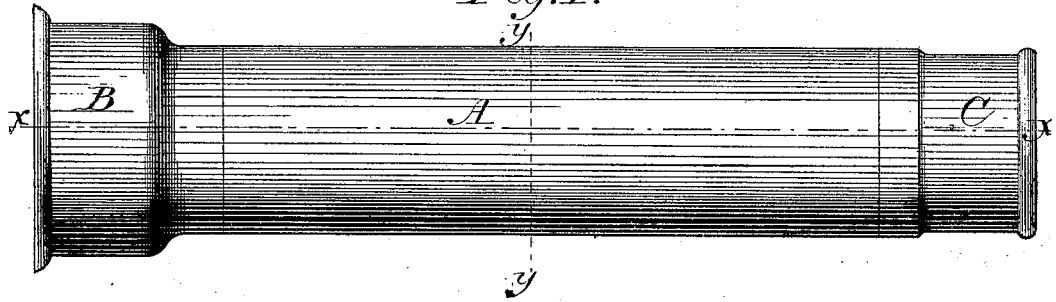
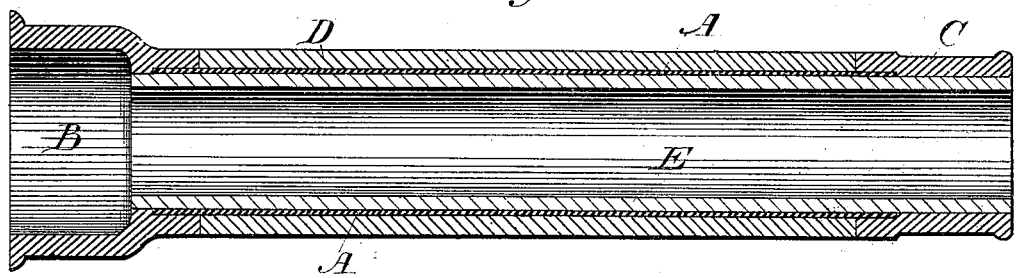
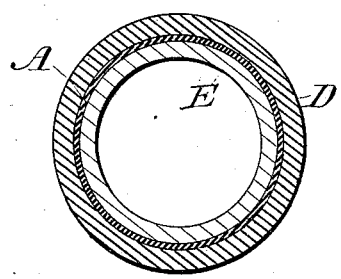
Witnesses:
M. Gardner
Alex. Scott
Inventor:
Mortimer M. Camp
By Andrew O'Neill
W. H. Pearce

UNITED STATES PATENT OFFICE.

MORTIMER M. CAMP, OF NEW HAVEN, CONNECTICUT.

PIPE FOR DRAINS, GAS, AND WATER.

SPECIFICATION forming part of Letters Patent No. 227,412, dated May 11, 1880.

Application filed March 1, 1880. (Model.)

*To all whom it may concern:*

Be it known that I, MORTIMER M. CAMP, a citizen of the United States, residing at New Haven, in the county of New Haven and State of Connecticut, have invented certain new and useful Improvements in Pipes for Drains, Gas, and Water; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to that class of gas, water, or drain pipes in which a sheet-metal cylinder is coated and lined with suitable compositions to protect the cylinder and prevent the contact of the gas or fluid with the metal; and it consists in providing such pipes with hub and spigot ends, so that the joints may be calked or packed, in the usual way, with cold or hot lead. The hub and spigot ends are of cast-iron, so as to have stiffness enough to withstand the pressure and blows in packing.

Figure 1 is an outside view of my finished pipe. Fig. 2 is a longitudinal section of the same on the line $x\ x$, Fig. 1. Fig. 3 is a vertical section on the line $y\ y$, Fig. 1.

The sheet-metal cylinder A has attached to it, by any suitable means, hub and spigot ends B C, of cast-iron or any material with sufficient strength to resist the pressure and blows necessary in calking the joints with lead, in the usual way. The space between the shoulders, formed by attaching said hub and spigot ends, as well as the ends themselves, is filled and coated with asphalt or any material, D, to preserve the metal, as shown. The inside of the pipe is lined with cement about one-half of an inch in thickness.

The lining E comes flush with the ends of the cylindrical portion of the pipe, so that when the sections are placed together the cement of one pipe will touch the cement of the next and prevent the gas or fluid from coming in contact with the iron.

I do not wish to limit myself to any particular metal or material out of which to construct this pipe; and I am aware that pipes have heretofore been made by coating and lining a metal cylinder, and also that such pipes have heretofore been provided with a cast-iron hub end; but they cannot be calked or packed, as the thin metal cylinder will not stand the pressure, and the lining is destroyed and the pipe rendered worthless.

By my improved construction I provide a pipe which has all the advantages of composition pipes and yet allows of the joints being packed by hammering or calking, the same as an ordinary cast-iron pipe, all the strain coming on the cast-iron ends.

Having thus described my invention, what I claim as new, and desire to secure by Letters Patent, is—

A composition pipe composed of a sheet-metal cylinder coated and lined with asphalt and cement, and provided with hub and spigot ends, the hub end A being constructed to receive the spigot end C and leave a space for calking, packing, or soldering, in the usual manner, as set forth.

In testimony whereof I affix my signature in presence of two witnesses.

MORTIMER M. CAMP.

Witnesses:
GEORGE R. COOLEY,
ANDREW O'NEILL.